(No Model.)
W. STEVENS.
ELEVATOR.
No. 305,542. Patented Sept. 23, 1884.
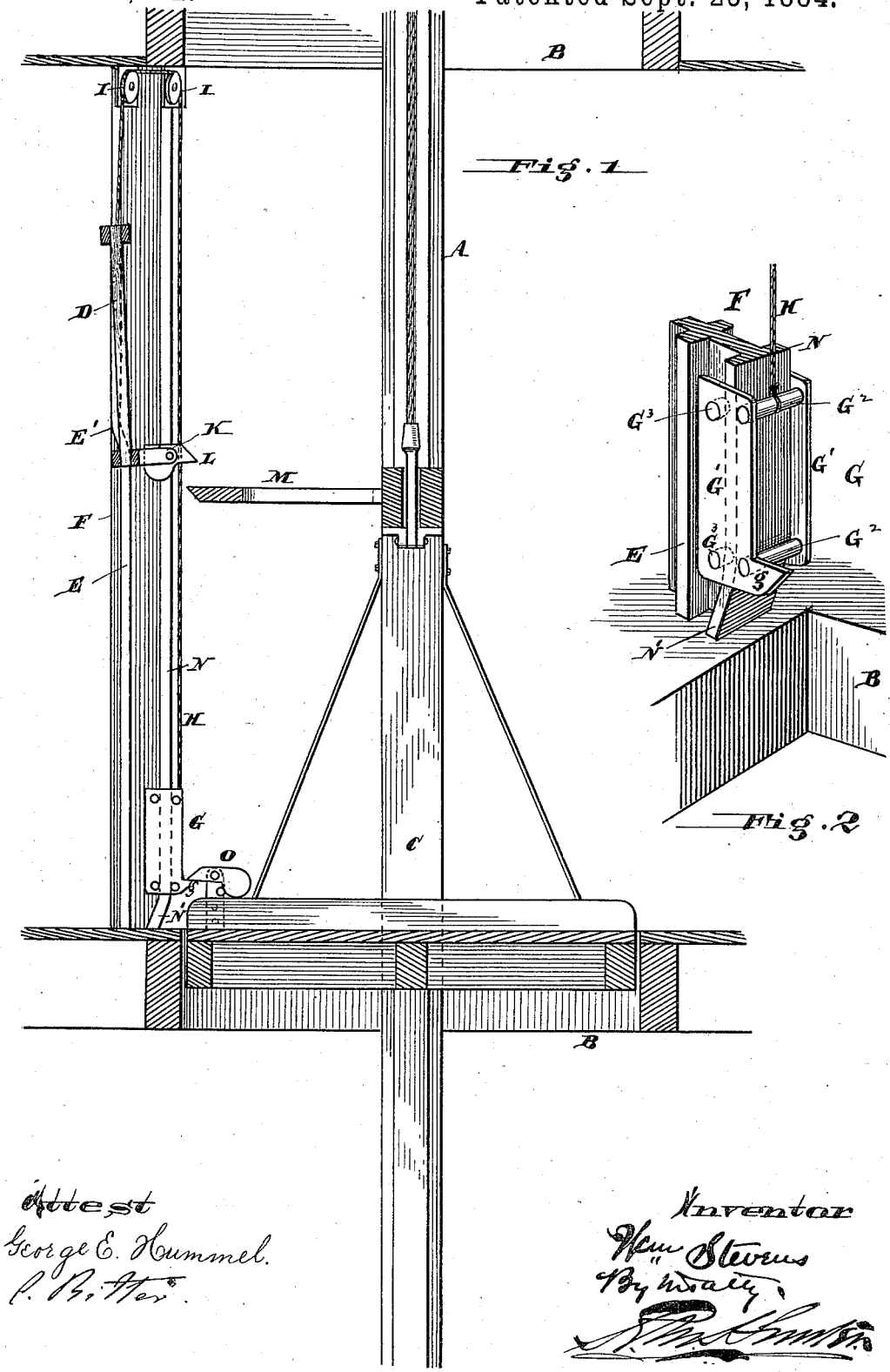

UNITED STATES PATENT OFFICE.

WILLIAM STEVENS, OF PHILADELPHIA, PENNSYLVANIA.

ELEVATOR.

SPECIFICATION forming part of Letters Patent No. 305,542, dated September 23, 1884.

Application filed May 24, 1884. (No model.)

*To all whom it may concern:*

Be it known that I, WILLIAM STEVENS, of the city and county of Philadelphia, and State of Pennsylvania, have invented new and useful Improvements in Elevators, of which the following is a specification.

My invention has reference to automatic hatchway-gates for elevators; and it consists in certain improvements whereby the elevator-cage, as it approaches a hatchway from above or below, automatically raises the gate, so that it is fully raised when the cage is on a level with the floor, and in details of construction, all of which are fully set forth in the following specification and shown in the accompanying drawings, which form part thereof.

The object of my invention is to provide elevator-hatchways with simple, cheap, and perfectly-working automatic gates, so that when the elevator-cage is away from a hatchway entrance thereto will be closed by a gate; but when the cage approaches said hatchway from either direction the gate shall be automatically raised.

In the drawings, Figure 1 is a sectional elevation of an elevator embodying my improvements; and Fig. 2 is a perspective view of the counterbalancing-weight and its guide, showing how it is drawn out of contact with the pawl on the cage.

A are the elevator guide-posts for the cage.

B is the hatchway.

C is the cage.

D is the vertically-sliding gate, and runs upon guide-rails E, arranged on posts F, placed one on each side of the entrance to the hatchway. This gate may be made in any manner desired, being preferably made of wooden bars, as indicated.

G is the counterbalance-weight for the gate, and is shown as made of two metal plates, G', secured together by studs G², and is made to straddle the guide-rail N on posts F, being prevented from leaving said rail by short studs G³, and is adapted to slide freely thereon. The gate D is connected to weight G by rope or chain H, which passes over pulleys I overhead. Therefore as the gate descends the weight ascends, and vice versa.

To raise the gate as the elevator-cage rises, I pivot to a support, K, on the gate a weighted pawl, L, free to be depressed, but not raised, and this pawl is adapted to be caught by arm M, secured to the cage C. Therefore as the cage ascends the arm M catches pawl L and lifts the gate with a speed equal to that of the cage. When the cage stops on a level with the floor, the gate remains raised; but as the cage ascends the gate is drawn away by a cam part, E', in the guide-rail E until the pawl L slips off the end of the arm M. The cage continues to move upward and the gate descends, raising the weight G; but this is caught by a pawl on the cage, and prevents the gate closing faster than the elevator rises.

To raise the gate as the elevator descends, I provide the following mechanism: The weight G is provided with a catch, $g$, and the platform or other part of the cage has a pivoted pawl, O, adapted to be depressed, but not raised. Now, as the cage descends the pawl O catches the weight and pulls it down, which action lifts the gate D. The moment the cage commences to pass down below the hatchway the catch $g$ and the weight G are drawn away from pawl O by the curved part N' of the guide-rail N. This frees the weight, and the gate commences to fall slowly, but is caught by the pawl on the said gate on the arm M, and allowed to close gently.

I do not limit myself to the catching of the gate in the act of closing by the cage; but I prefer to do so, for if the rope H broke there would not be as much liability to damage or injury to persons under it.

If desired, the pawl O might be on part G and the catch on the cage, and, if desired, an additional weight might be used beside the catch-guide G. Therefore, while I prefer the construction shown, I do not limit myself thereto, as the details may be modified in various ways without departing from my invention.

Having now described my invention, what I claim as new, and desire to secure by Letters Patent, is—

1. An elevator-cage, in combination with a vertically-sliding gate, guides therefor, a counterbalancing-weight, devices attached to said cage to catch said weight in the descent of the cage, and guides to withdraw said weight away from said devices upon the cage passing below the floor, thereby releasing the weight and allowing the gate to close by gravity, substantially as and for the purpose specified.

2. An elevator-gage, in combination with a vertically-sliding gate, cam-guides therefor, a catch carried by the cage and adapted to lift said gate in the upward movement of said cage, the cam-guides being so arranged that when the gate is lifted a certain height they draw it away from the catch, releasing it therefrom, which cage and catch move upward, allowing the gate to descend or close by gravity, a counterbalancing-weight for said gate, devices attached to the cage to catch said weight in the descent of the cage, and guide mechanism to withdraw said weight away from said devices upon the cage passing below the floor, thereby releasing the weight and allowing the gate to close by gravity, substantially as and for the purpose specified.

3. An elevator-cage and a vertically-sliding gate, in combination with a guideway for said gate, catching mechanism whereby the cage catches the gate and lifts it, and devices, substantially as set forth, to automatically draw said gate away from the cage and allow it to fall, substantially as and for the purpose specified.

4. The combination of cage C, having arm M, gate D, having a pivoted pawl, L, and cam guide-rails E E', substantially as and for the purpose specified.

5. The combination of cage C, having arm M, gate D, having a pivoted pawl, L, cam guide-rails E E', and counterbalancing devices for said gate, substantially as and for the purpose specified.

6. The combination of cage C, having arm M and pawl O, gate D, having pivoted pawl L, cam guide-rails E E', rope H, pulleys I, cam guide-rails N N', and weight G, having catch $g$, substantially as and for the purpose specified.

In testimony of which invention I hereunto set my hand.

WILLIAM STEVENS.

Witnesses:
R. M. HUNTER,
GEORGE E. HAMMEL.